March 17, 1925.
G. P. HAYNES
OIL AND WATER SEPARATING MEANS
Filed Dec. 19, 1923
1,530,078
2 Sheets-Sheet 1
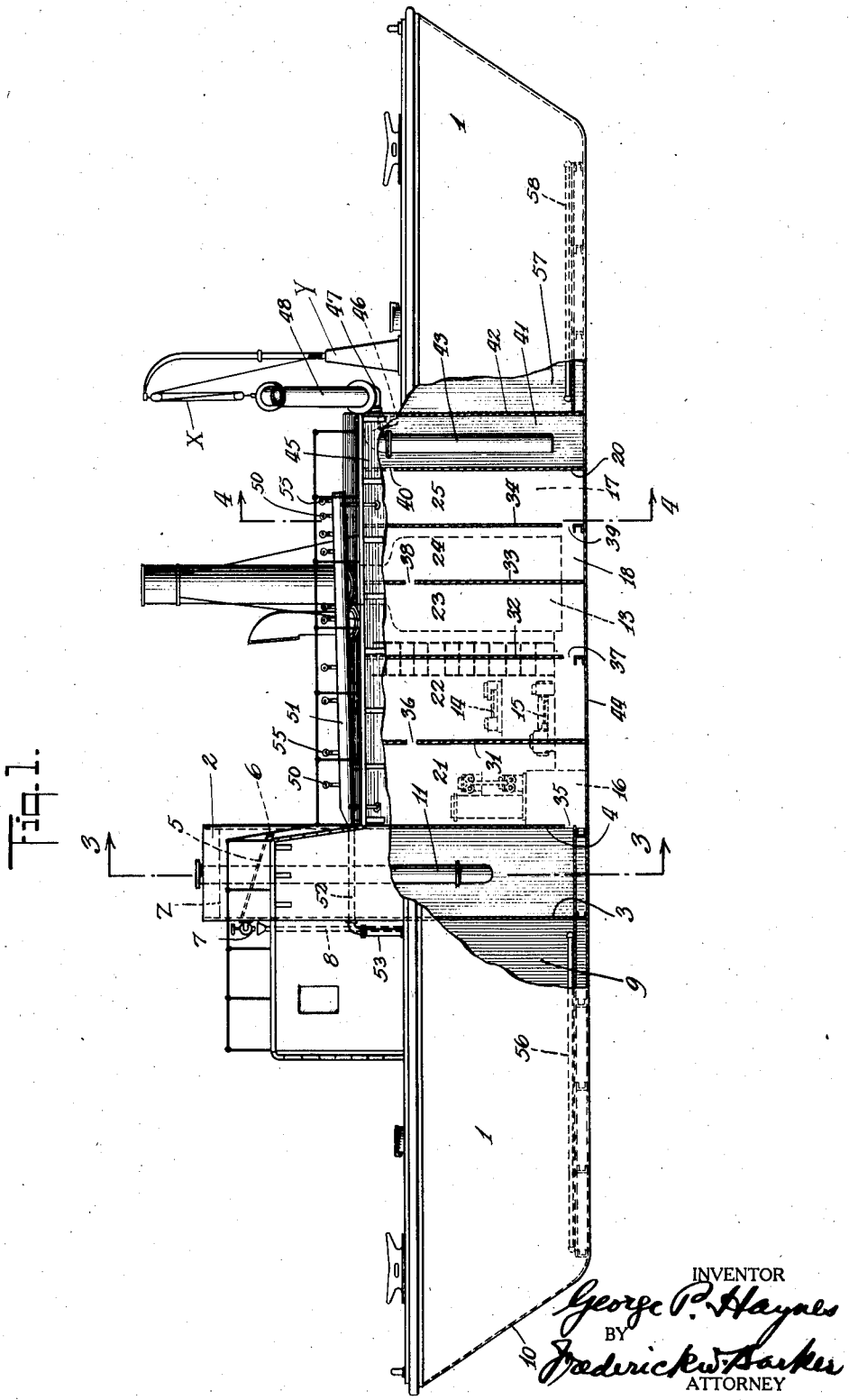

March 17, 1925. 1,530,078
G. P. HAYNES
OIL AND WATER SEPARATING MEANS
Filed Dec. 19, 1923 2 Sheets-Sheet 2
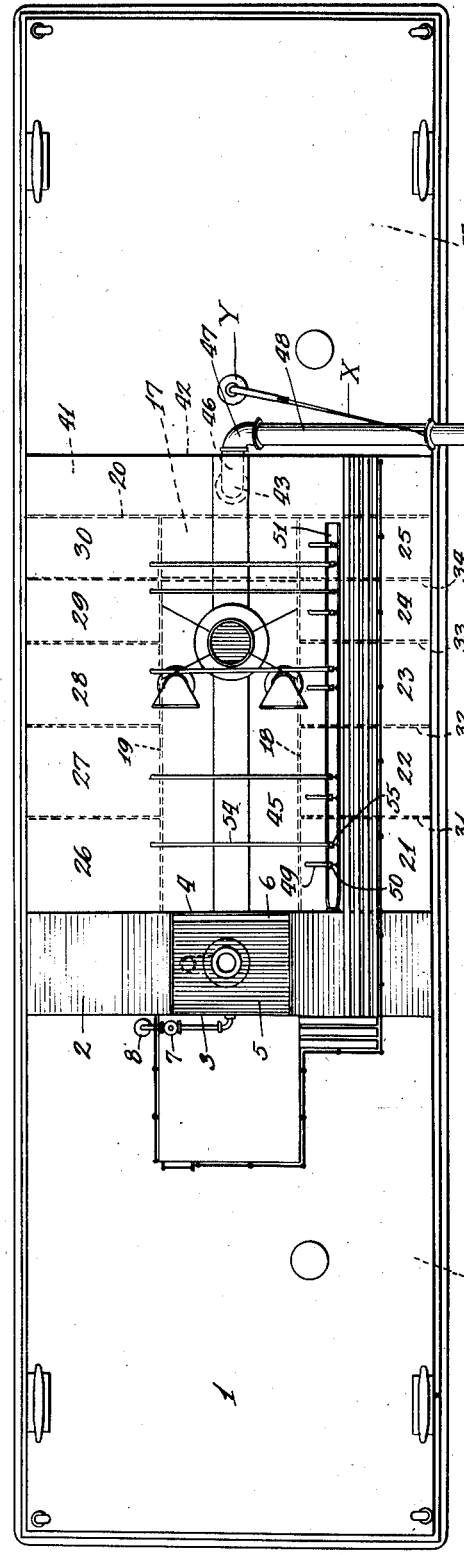
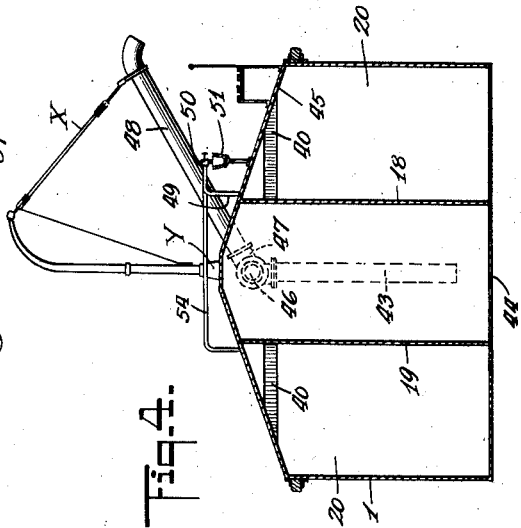
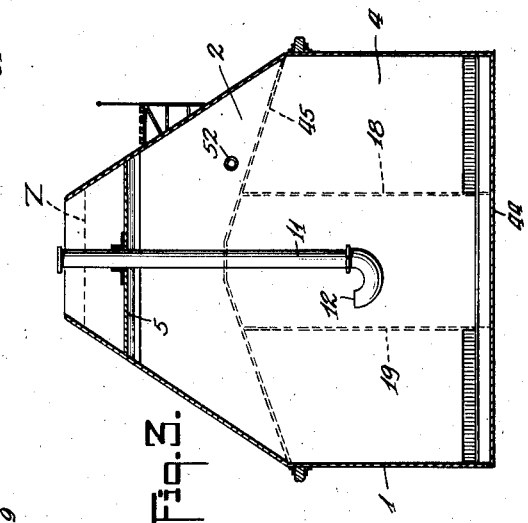
INVENTOR
George P. Haynes
BY
Frederick Barker
ATTORNEY Patented Mar. 17, 1925.

1,530,078

UNITED STATES PATENT OFFICE.

GEORGE P. HAYNES, OF NEW YORK, N. Y., ASSIGNOR TO TODD OIL BURNER AND ENGINEERING CORPORATION, OF NEW YORK, N. Y., A CORPORATION OF NEW YORK.

OIL AND WATER SEPARATING MEANS.

Application filed December 19, 1923. Serial No. 681,543.

*To all whom it may concern:*

Be it known that I, GEORGE P. HAYNES, a citizen of the United States, residing at the borough of Manhattan, city, county, and State of New York, have invented a new and useful Improvement in Oil and Water Separating Means, of which the following is a specification.

This invention relates to a vessel or barge which is particularly designed and equipped with means for the separation of oil from water, its main purpose being to receive the ballast water from oil carrying ships and to effect the separation by a system including a series of baffles, so arranged in air tight compartments that the strata of oil which form in the compartments may be subjected to head pressure in the system for delivery outside the compartments, while permitting the flow of clear water to continue toward another point of delivery.

The separating organism includes an entrance or main compartment, which I call a monitor, because it is in this compartment that the liquid head is established and regulated according to the desired rate of flow through the system. This monitor is of relatively large area, because thereby the liquid flow therein may be slow, giving time for oil to rise and become pocketed by an inclined baffle, located below the liquid level, whence it can be passed to a receiving compartment or emulsion tank.

The ballast water is delivered into the monitor upwardly at a lower point therein, and passes through an aperture near its base into an adjacent compartment, whose opposite wall is provided at a point intermediate its height with an aperture leading into a further compartment. I employ a succession of these compartments, which are air tight except for the inlet and outlet apertures. Therefore the oil which rises in the compartments above the outlet apertures will be entrapped beneath the cover or roof. This cover is inclined to form a baffle, and is provided at its peak with controlled outlet means, so that accumulated oil may be withdrawn therefrom under the head pressure, and thence passed into the receiving compartment.

The final compartment of the series contains a vertical pipe which extends to near the base thereof and enables the separated water to pass off through a delivery pipe which is adjustable as to its exit height, whereby the degree of head pressure in the system may be regulated.

Other features and advantages of my invention will hereinafter appear.

In the drawings:

Figure 1 is a side elevation, partly in section, of my improved oil and water separating barge.

Fig. 2 is a top plan view thereof.

Fig. 3 is a section on the line 3—3 of Fig. 1, and

Fig. 4 is a section on the line 4—4 of Fig. 1.

The hull of my improved barge is indicated in the drawings by the numeral 1. This term barge is not used by me in a limiting sense but as representative of a vessel suited to the purposes of my invention.

The barge is intended to lie alongside an oil carrying or oil using ship when the ballast water or bilge water therefrom is to be pumped overboard, the barge receiving this water, from which it separates and conserves the contained oil and delivers overboard only the clear water.

The barge is provided toward one end with a monitor 2 which is in the form of a compartment having the spaced walls 3, 4 that extend transversely from side to side of the hull. The monitor 2 is open at its top, and contains, near its upper end, a transverse baffle 5 that extends at a downward inclination from the wall 3 toward the wall 4, but a clearance 6 is left between the lower edge of the baffle and wall 4. This is to permit the liquid level to rise in the monitor above the baffle while oil becomes trapped beneath the baffle.

A drain valve 7 in wall 3, just below the peak of baffle 5, enables the entrapped oil to be passed off, and conveyed, as by a stand pipe 8, into an emulsion tank 9, which is provided between the wall 3 and the barge end 10.

Extended downwardly within the monitor is a pipe 11, whose upper end is intended to connect with a hose (not shown) by which bilge water or ballast water is delivered from a ship's bottom or oil tanks. This pipe 11, which is suitably supported, being here shown connected to the baffle 5, through which it is passed, has an upturned lower end 12, suitably distanced from the monitor bottom, so that it may deliver the ballast water in an upward stream within the monitor. The particular purpose of this arrangement will appear hereinafter in the description of the operation.

In the plan view of Fig. 2, there will be seen a midship section which contains a vertical donkey-boiler 13, feed pump 14, oil and water pump 15, fuel tank 16, and feed water tank 17. These or equivalent equipment devices are useful adjuncts in the operation of the system, though forming no part of the oil and water separating means. This midship section is contained between two longitudinal bulkheads 18, 19, and the monitor wall 4, and a transverse wall 20, which latter, like the wall 4, extends from side to side of the hull. Between the walls 4 and 20 are two series of oil and water separating compartments, one series of compartments 21, 22, 23, 24 and 25 being provided between the bulkhead 18 and its adjacent side of the barge, and the other series 26, 27, 28, 29 and 30 being provided between the bulkhead 19 and its adjacent side of the barge.

Since the compartments of both series are alike it will suffice to describe those of one series.

For instance the compartment 21 is formed between wall 4 and a transverse wall 31, compartment 22 is formed between wall 31 and a succeeding wall 32, and similarly the compartments 23, 24 and 25 are formed between the pairs of walls 32, 33; 33, 34; and 34, 20. Inlet to compartment 21 is through a base opening 35 in wall 4; inlet to compartment 22 is through an intermediate opening 36 in wall 31, and succeeding walls alternately have the base and intermediate inlet openings 37, 38 and 39, the wall 20 having the intermediate opening 40 which leads into a compartment 41 that extends across the barge from side to side thereof, formed between wall 20 and a final wall 42; this compartment 41 being the last of the series and containing a delivery pipe 43 for the clear water that flows therein. Excepting for their inlets and the outlet pipe 43 the compartments are air tight, being closed by the bottom 44 and the inclined or peaked cover or roof 45.

The reception end of pipe 43 is located a suitable distance above the base 44 to be below traces of oil which may have entered the final compartment 41, but which will tend to rise and lie in an upper stratum therein. Hence it will be practically clear water that passes through pipe 43. An elbow joint 46 connecting with the top of pipe 43 is extended through wall 42, and there engages, by a swivelled joint 47 with a delivery pipe 48, which can thus be swung through a vertical plane to vary the elevation of its discharge end. The tackle X carried by a standard Y on the barge is shown as the operating means.

The compartments 21, 22, 23, 24, and 25 are each provided, near the peak of their common cover 45, with discharge pipes 49 which each have a controlling valve 50, the pipes 49 being all arranged to discharge into a trough 51, suitably supported upon roof 45, lengthwise of the barge, and disposed in an inclined plane extended downwardly toward the monitor, where it connects with a pipe 52 that passes through the monitor, and beyond the monitor is provided with an outlet that connects with a stand pipe 53 which communicates with the emulsion tank 9.

Now it will be appreciated that with the openings 36, 38 and 40 through the vertical baffles located at an intermediate point in the height of said baffles, nearer the cover than the bottom, and with a sluggish flow of liquid through the system, allowing time for the oil to rise in the respective compartments—the openings 36, 38 and 40 being relatively narrow slots—the oil in the compartments will become entrapped therein above said slots and subjected to the head pressure at which the system is operating. In consequence, when, periodically, any one or more of the valves 50 are opened by an attendant, the entrapped oil will be forced out through pipes 49 into trough 51, for delivery, through pipes 52 and 53 to the emulsion tank 9.

The inlet 40 to compartment 41 is shown as in a higher plane than the other inlets. This is because the liquid that has reached compartment 25 will be almost denuded of oil, and there will be little if any oil remaining to collect above inlet 40.

As has previously been stated, the compartments 26, 27, 28, 29 and 30, at the other side of the midship section, are identical in every respect with the compartments 21, 22, 23, 24 and 25, the liquid leaving the monitor being divided by the midship section and being subject in each series of compartments to similar treatment for the separation and pocketing of the oil, leaving the clear water from both series to pass into the final compartment 41.

The trough 51 receives the entrapped oil from compartments 26, 27, 28, 29 and 30 by way of pipes 54, each controlled by a valve 55, which, like the valves 50 may be operated by an attendant from a gangway 56.

In the operation of my improved separating system, the discharge pipe 48 is first raised to such a height as will bring the point of discharge level with the required liquid level in the monitor. All compartments and the monitor are then filled with sea water, using pump 15 and carrying up to the level indicated by the dotted line Z. Then a ship's overboard discharge hose is connected to the pipe 11. When pumping of ballast water or bilge water has started up, establishing a flow through the pipe 11, the monitor and the compartments, the operator lowers the discharge pipe 48 sufficiently to provide the drop in head necessary to cause the flow through the system at about the same rate at which the ship is discharging. This need not be exactly correct, as within certain limits it is automatic.

If the pipe 48 is not lowered sufficiently the water level in the monitor will rise, thereby providing additional head, if too much the level will fall. The level in the monitor 2 should be such as will provide a liquid head capable of exerting a moderate pressure in the compartments, so that the oil entrapped above the slots may when accumulated to a suitable depth be forced out through the pipes 49, 54, upon opening the valves 50, 55. This liquid head is sufficient at all times to maintain the closed compartments entirely filled with the oil and water.

After the pumping operation the oil in tank 9 can be heated, as by the heater coils 56, to facilitate the separation of whatever water may remain in the oil. Then the water in tank 9 is pumped into the monitor until oil shows therein; and the dehydrated oil in tank 9 is then pumped by suitable means, not herein shown, into the tank 57 at the other end of the barge. This tank 57 may also be provided with heating coils 58.

It is a feature of my invention that strata of oil are permitted to form to certain depths within the closed compartments, above the slots in the dividing walls through which the water flows into succeeding compartments, the oil being thus pocketed and subjected to the pressure of the liquid head in the system, so that when any of the valves 50 and 55 are opened, oil from the compartments controlled by those valves will be discharged for delivery to the emulsion tank.

A further feature of my invention, it will be noted, consists in restricting the upper area of the closed compartments, as evidenced in the present example by the inclined covers 45, and in draining said compartments from their peaks or most restricted portions, as in this manner the stratum of oil formed in a compartment above a slot 36, 38 or 40 may be completely drained therefrom upon opening the valve which serves that compartment, notwithstanding the barge or vessel may be subject to motion communicated by the body of water in which it floats. The restricted upper or drainage portions of the closed compartments therefore avoid the necessity of maintaining a horizontal level therein.

Variations within the spirit and scope of said invention are equally comprehended by the foregoing disclosure.

I claim:

1. An apparatus for separating mixed oil and water which comprises a series of closed compartments having communicating means, a supply compartment having reception means for the mixed liquid, an inclined baffle located in said supply compartment, to entrap oil thereunder, discharge means for the entrapped oil, near the peak of the baffle, and a delivery compartment having discharge means, means for establishing a liquid head in the apparatus, the closed compartments serving to pocket oil rising therein to be subjected to the head pressure, the communicating means permitting the separated water to flow to the successive compartments for discharge from the delivery compartment, and controlled means for discharging the pocketed oil.

2. A flotation vessel having a midship section, series of closed compartments at opposite sides thereof, and a final compartment common to both series, the compartments of each series and the final compartment having communicating means, a supply compartment having reception means for a ship's discharge of mixed water and oil, means for establishing a pressure head in said compartments, means of communication from said supply compartment to the first closed compartment of each series, an emulsion receiving compartment at one end of the vessel, and an oil receiving compartment at the other end of the vessel, the supply compartment having inclined baffle means to entrap oil rising therein, drainage means at the upper portion of said baffle, the closed compartments each having upper portions of restricted area, drainage means for said portions of restricted area, separate means for conveying oil drained from the supply and closed compartments to the emulsion compartment, means for discharging water from the final compartment, and means for transferring oil from the emulsion compartment to the oil receiving compartment.

3. In an apparatus for separating mixed oil and water, the combination, in a covered vessel, of a series of vertical partitions within said vessel extending up to its cover, said partitions being spaced apart to form succeeding, closed compartments, alternate partitions being provided with openings respectively toward their lower and upper portions as means of communication between adjacent compartments, the upper openings being spaced from the cover, means of supplying mixed oil and water under head pressure to fill said compartments in succession, those portions of the partitions above the upper openings therein serving to entrap the top strata of oil within the compartments, means for releasing the entrapped oil, and means for delivering the separated water from the last compartment of the series.

4. In an apparatus for separating mixed oil and water, the combination, in a covered vessel, of a series of vertical partitions within said vessel extending up to its cover, said partitions being spaced apart to form succeeding, closed compartments, said closed compartments having upper portions of restricted area, alternate partitions being provided with openings respectively toward their lower and upper portions as means of communication between adjacent compartments, the upper openings being spaced from the cover, means of supplying mixed oil and water under head pressure to fill said compartments in succession, those portions of the partitions above the upper openings therein serving to entrap the top strata of oil within the restricted upper portions of the compartments, means for releasing the entrapped oil, and means for delivering the separated water from the last compartment of the series.

5. In an apparatus for separating mixed oil and water, the combination, in a covered vessel, of a series of vertical partitions within said vessel extending up to its cover, said partitions being spaced apart to form succeeding closed compartments, and alternate partitions being provided with openings respectively toward their lower and upper portions as means of communication between adjacent compartments, the upper openings being spaced from the cover, a supply compartment of relatively large capacity and of greater height than the closed compartments having reception means for the mixed liquid, said supply compartment communicating near its base with the first of said closed compartments, and a delivery compartment, having discharge means, in communication with the last of said closed compartments, those portions of the partitions above the upper openings therein serving to entrap the top strata of oil within the closed compartments, and means for releasing the entrapped oil.

Executed this 14th day of December, 1923.

GEORGE P. HAYNES.